Oct. 31, 1967 A. I. ZUMWALT 3,349,947
CLOSURE
Filed Sept. 8, 1964
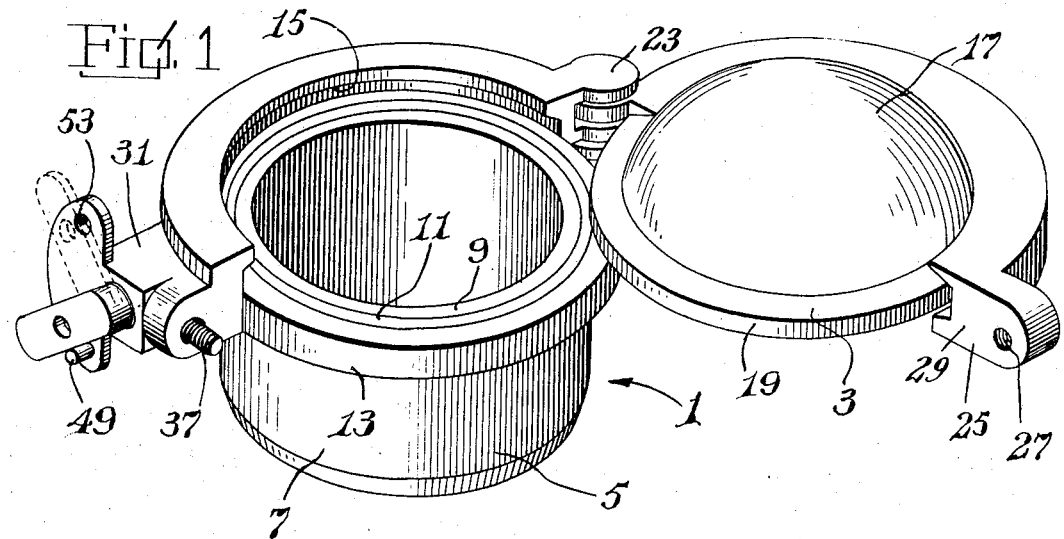
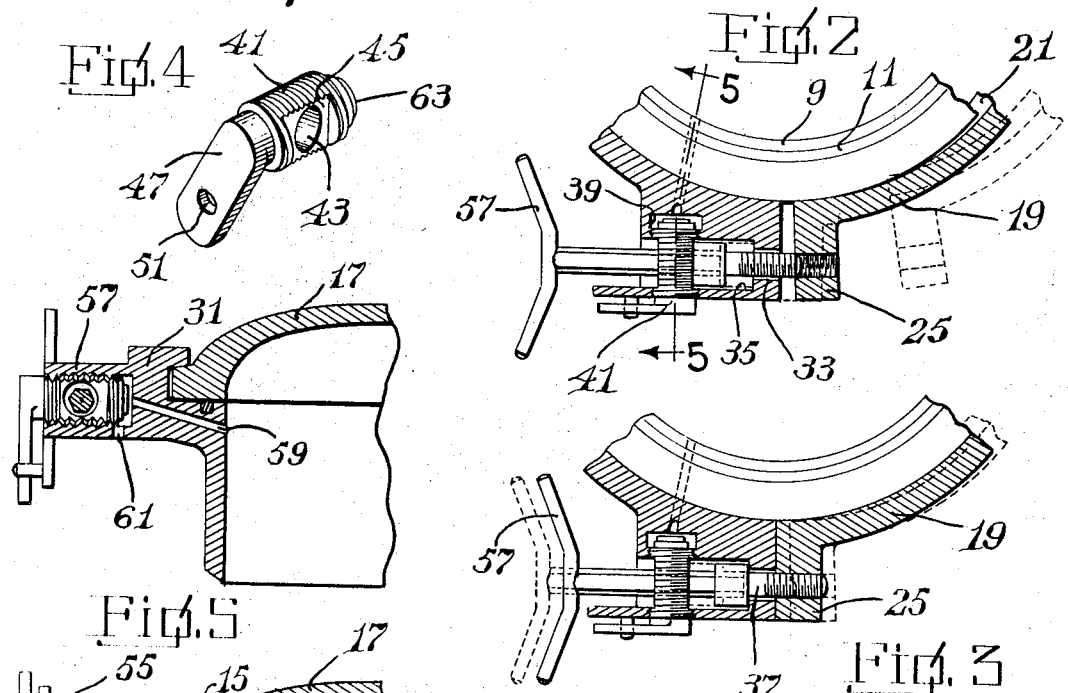
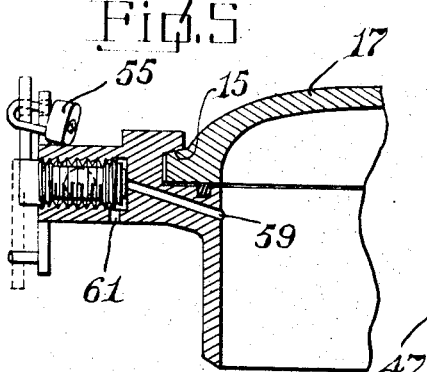
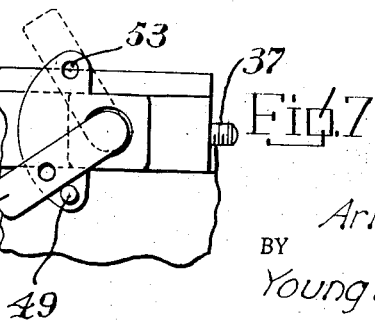
INVENTOR.
Arlie I. Zumwalt
BY
Young and Thompson
ATTYS.

United States Patent Office 3,349,947
Patented Oct. 31, 1967

3,349,947
CLOSURE
Arlie I. Zumwalt, 3709 E. 44th St.,
Tulsa, Okla. 74135
Filed Sept. 8, 1964, Ser. No. 394,716
3 Claims. (Cl. 220—33)

ABSTRACT OF THE DISCLOSURE

A closure is provided with a fastener, and a rotatable screw has a transverse hole therethrough that prevents or permits access to the fastener, depending on the rotated position of the screw. The screw is also the valve member of a pressure-equalizing valve, this valve being opened by the screw in its access-permitting position and closed by the screw in its access-preventing position. The fastener is a second screw, and the first screw presents a transverse face to the head of that second screw in the access-permitting position, so that when the second screw is backed off to open the closure, it will back up against that transverse face and thereafter will push the closure open.

---

The present invention relates to closures, more particularly of the type in which a fastener secures a closure in closed position. The invention will be disclosed and illustrated in connection with a pipe end closure of the type used for closing the ends of auxiliary entry pipes attached to main pipelines for the purpose of providing entry to the pipeline at various points along the pipeline to permit the introduction of cleaning devices into the pipeline. Although the invention will be described in this environment, it will of course be understood that it has utility in any of a variety of environments in which a closure provided with a fastener for the closure is to be used.

Accordingly, an object of the present invention is the provision of a closure that closes easily but seals tightly.

Another object of the present invention is the provision of a closure which is protected against unauthorized opening.

Still another object of the present invention is the provision of a closure having means for readily initiating opening movement of the closure by the application of only relatively small force at great mechanical advantage.

A still further object of the present invention is the provision of a closure for a space having a pressure different from ambient pressure, which automatically provides for pressure equalization prior to opening the closure.

Finally, it is an object of the present invention to provide closures which will be relatively easy and inexpensive to manufacture and install, simple and dependable to operate, and rugged and durable in use.

Other objects, features and advantages of the present invention will become apparent from a consideration of the following description, taken in connection with the accompanying drawing, in which:

FIGURE 1 is a perspective view of a closure according to the invention, embodied in a pipe end closure, shown in open position;

FIGURE 2 is an enlarged fragmentary top plan view of closure structure according to the present invention in the region of the fastener therefor, with the parts shown in the position they occupy at an intermediate stage of a closing operation or an opening operation;

FIGURE 3 is a view similar to FIGURE 2, but showing the parts of the position they occupy in a fully closed position of the closure of the present invention;

FIGURE 4 is an enlarged perspective view of a plug member for use with the present invention;

FIGURE 5 is an elevational cross-sectional view taken on the line 5—5 of FIGURE 2;

FIGURE 6 is a view similar to FIGURE 5 but showing the parts in a locked position that prevents unauthorized tampering with the fastener of the closure means; and FIGURE 7 is a left-side elevational view of the structure shown in FIGURES 5 and 6 with the position of FIGURE 5 shown in full line and the position of FIGURE 6 shown in phantom line.

Referring now to the drawing in greater detail, there is shown a closure indicated generally at 1, in the form of a pipe end closure adapted to be secured as by welding to the free end of an auxiliary entry pipe which in turn connects at a small angle with a main pipeline. The purpose of devices such as are illustrated is to open and close the pipeline entries to permit the introduction of a pipe cleaner or scraper of the type known in the pipeline art as a "go-devil" or "pig." These devices are of the type that move independently in the pipeline, and are introduced at any selected entry along the length of the pipeline and travel with the fluid in the pipeline, scraping the sidewalls of the pipeline clean as they move along. They are then recovered at the discharge end of the pipeline or at any selected point intermediate the length of the pipeline farther downstream.

Closure 1 is comprised broadly of a closure member 3 swingably mounted on an annular body 5. More particularly, annular body 5 comprises a cylindrical body portion 7 adapted to be welded on the open end of an entry as described above, as a continuation of the entry. Body 5 terminates endwise outwardly in a uniplanar seating surface 9 which is disposed in a single plane perpendicular to the axis of body 5. Seating surface 9 is provided with an outwardly opening annular groove in which is disposed an O-ring 11 of the usual construction and arrangement.

Body 5 is provided halfway thereabout with an annular flange 13 the axially outer surface of which provides a large part of seating surface 9. On the side of body 5 opposite flange 13, body 5 is provided with a semicircular projection that carries on its inner surface an annular groove 15 coaxial with and opening toward the axis of body 5.

Closure member 3 comprises a lid 17 mounted for swinging movement transverse to the axis of body 5. On its underside, lid 17 is provided with an annular seating surface which is uniplanar and disposed in a plane perpendicular to the axis of body 5 at all times. The leading edge of the closure member during closing movement is an annular flange 19 that extends halfway around lid 17 and has outer surfaces that are complementary to and engage with the inner surfaces of annular recess 15 in the closed position of the parts. The trailing edge of the closure member during closing movement is provided with an inwardly opening annular recess 21 which is complementary to and engages with flange 13 in the closed position of the parts.

In order to mount lid 17 for swinging movement as described on body 5, both body 5 and lid 17 are provided with interfingering hinge ears 23 through which passes a hinge pin (not shown). If desired, the hinge pin can be screw threaded to coact with screw threads on the hinge ears of lid 17 so that lid 17 has a helical closing and opening movement with a small component of movement axially toward body 5 upon closing and away from body 5 upon opening so as to facilitate the sealing of lid 17 on body 5.

Closure member 3 is provided with generally radially outwardly extending ear 25 having a screw-threaded opening 27 therethrough. Opening 27 is disposed generally tangentially and is perpendicular to but spaced from the axis of swinging movement of closure member 3 and also to the axis of annular body 5 in the closed position of the parts. Ear 25 has a generally radially extending flat surface 29 on what is its leading side during closing movement.

On body 5, the part corresponding to ear 25 is an enlargement 31 disposed closely adjacent ear 25 in the closed position of the part. Enlargement 31 has a bore 33 therethrough that is in substantial alignment with opening 27 in the closed position of the parts shown in FIGURE 3. Bore 33 has an enlarged counterbore 35 therein on the side of bore 33 opposite ear 25. A screw-threaded bolt 37 extends loosely through counterbore 35 and bore 33. The shank of bolt 37 is smaller than bore 33, while the head of bolt 37 is smaller than counterbore 35 but larger than bore 33. It is intended that in the closed position of the parts shown in FIGURE 3, bolt 37 will engage in the screw threads of opening 27 in ear 25 and will draw ear 25 and enlargement 31 together until radially disposed surface 29 on ear 25 is in contact with or closely adjacent a corresponding radially disposed surface on enlargement 31. In this closed position, the head of bolt 37 bears against the bottom of counterbore 35 to hold closure member 3 tightly closed.

Enlargement 31 is also provided with a crossbore 39 therein, which crosses bores 33 and 35 at right angles but is disposed in the same plane which includes the axes of bores 33 and 35 and is perpendicular to the axis of body 5. The axis of crossbore 39 intersects the axes of bores 33 and 35. Crossbore 39 is internally screw threaded on both sides of counterbore 35, and an externally screw-threaded plug 41 is screw threadedly mounted in the internal screw threads of crossbore 39. Plug 41 has an opening 43 therethrough that is coaxial with bores 33 and 35 in one rotated position of plug 41. Opening 43 is surrounded by a flat 45 cut into plug 41; and in that rotated position of plug 41 in which opening 43 is coaxial with bores 33 and 35, flat 45 will be perpendicular to that common axis. Flat 45 is parallel to the axis of plug 41, and the screw threading of plug 41 preferably extends beyond both ends of flat 45 axially of plug 41. Plug 41 has a handle or operator 47 that is disposed outside crossbore 39 and that is elongated radially of the axis of plug 41.

Manipulation of operator 47 thus rotates plug 41 in the screw threads of crossbore 39 selectively to align and misalign opening 43 with the axis of bolt 37. When opening 33 is thus aligned, access is provided to the head of bolt 37 to tighten or loosen bolt 37. This access-providing position of plug 41 is located by means of a stop 49 on enlargement 31. When operator 47 contacts stop 49, then opening 43 will be in axial alignment with bores 33 and 35 and with bolt 37. In other rotative positions of plug 41, however, opening 43 will be so misaligned with the axes of bores 33 and 35 as to prevent access to bolt 37 and thus protect bolt 37 from unauthorized tampering. One such other position is shown in phantom in FIGURES 1 and 7 and in full line in FIGURE 6. To maintain plug 41 in such other position against unauthorized rotation, operator 47 is provided with a hole 51 therethrough that is selectively registrable with a hole 53 through a portion of enlargement 31. When holes 51 and 53 are thus aligned with each other, a lock such as a padlock 55 can be slipped through both holes 51 and 53 and locked, so that only authorized persons now can rotate 41 into its access-providing position.

There are, of course, many ways in which bolt 37 can be manipulated through opening 43. One such way is shown in FIGURES 2 and 3, in which a key wrench 57 is shown extending through opening 43 and engaging in a polygonal recess in the head of bolt 37 so that upon rotation of wrench 57, bolt 37 may be manipulated as desired.

Another important feature of the present invention is means for equalizing the pressure within the closure with the pressure outside the closure prior to opening the closure. For example, if the pressure inside the closure were substantially greater than the pressure outside the closure, then a sudden opening of the closure might be quite dangerous to nearby persons. Accordingly, there is also provided in the structure of the present invention a pressure relief vent 59 that opens through a central portion of the bottom of crossbore 39 and communicates with the interior of the closure through body 5. Another vent 61 communicates between an inner portion of crossbore 39 and the ambient, which is ordinarily the open atmosphere, and to this end extends through a sidewall of enlargement 31.

It will be recalled that plug 41 is screw-threadedly rotatable in crossbore 39, and this screw-threaded engagement assures that plug 41 will have helical movement along its axis toward and away from the bottom of crossbore 39. Specifically, in moving from the full line to the phantom line position in FIGURES 1 and 7, plug 41 is screwed into crossbore 39; while in moving from the phantom line to the full line position in FIGURES 1 and 7, plug 41 is screwed out of crossbore 39. Plug 41 is also provided on its inner end, adjacent the bottom of crossbore 39, with a valve disk 63 which may be of some suitably yieldable material such as neoprene or the like. The relationship of crossbore 39 and plug 41 and pressure relief vent 59 and valve disk 63 is such that vent 59 is open in the full line position of FIGURES 1, 5 and 7 but is closed in the full line position of FIGURE 6 and the phantom line position of FIGURES 1 and 7. In other words, rotating plug 41 in a direction to prevent access to bolt 37 also closes the pressure relief vent 59; while rotating plug 41 in a direction to provide access to bolt 37 through opening 43 also opens the pressure relief vent 59 so that differences in pressure between the interior of the closure and the ambient will equalize themselves through vents 59 and 61 and through the inner end of crossbore 39.

In operation, the closure of the present invention is closed by swinging closure member 3 about the hinge of hinge ears 23 toward the left as seen in FIGURE 1. Bolt 37 initially contacts the margins of opening 27 and is pushed to the left as seen in FIGURE 2. Plug 41 is in the full line position of FIGURE 1, which is also the position of FIGURES 2 and 3, so that opening 43 is in alignment with bolt 37. Flat 45 is thus disposed perpendicular to the axis of bolt 37 and the head of bolt 37 is pressed back against flat 45.

When closure member 3 is swung as far to the left as seen in FIGURE 2 as is possible, a tool such as wrench 57 is inserted through opening 43 and into the head of bolt 37 and turned to start bolt 37 into screw-threaded opening 27. Bolt 37 is then tightened down until its head contacts the bottom of counterbore 35. Further screwing of bolt 37 draws closure member 3 from the phantom line to the full line position of FIGURE 3 with great mechanical advantage, whereupon closure 1 is completely closed.

Wrench 57 is then withdrawn, and operator 47 is swung upwardly until holes 51 and 53 are in alignment with each other, whereupon the shank of padlock 55 is slipped through the two holes and the padlock closed to lock the parts in the position of FIGURE 6 against unauthorized operation. The raised position of operator 47 is also the closed position of plug 41 as a valve for pressure relief vent 59, as is seen in FIGURE 6. In this position, the valve disk is tightly pressed against the end of vent 59 that opens through the bottom of crossbore 39, thereby to permit a pressure differential to build up between the interior of closure and the ambient.

To open closure 1, it is necessary only to unlock padlock 55 and to swing operator 47 downwardly against stop 49. This does three things: it opens pressure relief vent 59 to permit the pressure within the closure 1 to equalize with the ambient; it aligns opening 43 with bolt 37; and it positions flat 45 perpendicular to the axis of bolt 37. Thereafter, upon insertion of wrench 57, bolt 37 may be unscrewed from opening 27. During this unscrewing movement, bolt 37 moves to the left from the position shown in FIGURE 3 to a position shown in FIGURE 2. Once the head of bolt 37 contacts flat 45, however, bolt 37 continues to turn under the impetus of wrench 57 but no longer moves to the left as seen in FIGURE 2. Instead, closure member 3 is now forced to the right as sene in FIGURE 2 with great mechanical advantage until the screw threads of bolt 37 are clear of the screw threads of opening 27, which is the full line position of FIGURE 2. This last unscrewing of bolt 37 with the head of bolt 37 disposed against flat 45 thus provides a means of exerting strong mechanical leverage on closure member 3 to initiate the opening movement of closure member 3. After the parts are in the position shown in full line in FIGURE 2, however, it is relatively easy to complete the opening of closure 3 manually without the aid of special tools.

From a consideration of the foregoing disclosure, therefore, it will be appreciated that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A closure for a space at a pressure different from ambient, comprising a screw-threaded fastener for the closure, the fastener having a head at one end for rotating the fastener, a valve having a valve member movable between an open position to equalize the pressure between said space and the ambient and a closed position to maintain said space at a pressure different from ambient, the valve member being screw-threaded to rotate about its axis and to move helically between said open and closed position, the axis of the valve member and the axis of the screw-threaded fastener being disposed substantially at right angles to each other, the valve member being disposed closely adjacent said fastener head, the valve member having an opening therethrough disposed transverse to the axis of the valve member, said opening being aligned with the axis of the fastener in the open position of the valve member to give access to the fastener head and misaligned with the axis of the fastener to prevent access to the fastener head in the closed position of the valve member, so that the fastener can be released only when the valve has first been opened and the pressure equalized between said space and the ambient.

2. A closure as claimed in claim 1, said fastener head being larger in diameter than said opening so that the fastener head backs up toward and then bears against the valve member about said opening through said valve member during opening movement of the fastener.

3. A closure as claimed in claim 2, the surface of said valve member which is contacted by the fastener head about said opening being flat and being disposed in a plane perpendicular to the axis of the fastener.

References Cited
UNITED STATES PATENTS

| | | | |
|---|---|---|---|
| 1,141,223 | 6/1915 | Watts | 270—3.2 |
| 1,508,894 | 9/1924 | Morrison | 220—33 |
| 1,514,507 | 11/1924 | Dreichlinger | 220—55 |
| 2,869,752 | 1/1959 | Hall | 220—40 |

FOREIGN PATENTS

| | | |
|---|---|---|
| 607,148 | 12/1934 | Germany. |
| 939,679 | 11/1948 | France. |

DONALD F. NORTON, *Primary Examiner.*

G. E. LOWRANCE, *Assistant Examiner.*